United States Patent
Kashiwagi et al.

(10) Patent No.: US 8,885,284 B2
(45) Date of Patent: Nov. 11, 2014

(54) INFORMATION WRITE APPARATUS AND INFORMATION WRITE METHOD

(71) Applicant: Kabushiki Kaisha Toshiba, Tokyo (JP)

(72) Inventors: Kazuto Kashiwagi, Yokohama (JP);
Takeyori Hara, Kawasaki (JP);
Takayuki Kawabe, Sagamihara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/780,744

(22) Filed: Feb. 28, 2013

(65) Prior Publication Data

US 2014/0118857 A1    May 1, 2014

(30) Foreign Application Priority Data

Oct. 30, 2012    (JP) .................................. 2012-239489

(51) Int. Cl.
*G11B 5/56*    (2006.01)

(52) U.S. Cl.
CPC ...................................... *G11B 5/56* (2013.01)
USPC ......................................................... 360/75

(58) Field of Classification Search
None
See application file for complete search history.

(56) References Cited

U.S. PATENT DOCUMENTS

| | | | | |
|---|---|---|---|---|
| 7,394,607 | B2 * | 7/2008 | Ohno et al. | 360/60 |
| 7,423,828 | B2 * | 9/2008 | Emo et al. | 360/60 |
| 7,440,221 | B2 * | 10/2008 | Tsuchinaga et al. | 360/77.01 |
| 8,638,522 | B2 * | 1/2014 | Matsuo et al. | 360/77.02 |
| 2004/0190188 | A1 | 9/2004 | Zaitsu | |
| 2012/0162814 | A1 | 6/2012 | Kimizuka | |

FOREIGN PATENT DOCUMENTS

| | | |
|---|---|---|
| JP | 11-345470 A | 12/1999 |
| JP | 2002-230708 A | 8/2002 |
| JP | 2004-303303 A | 10/2004 |
| JP | 2006-252631 A | 9/2006 |
| JP | 2012-138157 A | 7/2012 |

* cited by examiner

*Primary Examiner* — K. Wong
(74) *Attorney, Agent, or Firm* — Posz Law Group, PLC

(57) ABSTRACT

According to one embodiment, an information write apparatus writes a track on a magnetic disk by a shingled write recording method. The information write apparatus calculates a write target position of the track based on a pitch. The information write apparatus calculates a positioning error. The information write apparatus stores the calculated positioning error. The information write apparatus integrates positioning errors of tracks written before the predetermined track is written, and corrects a write target position based on the integrated positioning error. The information write apparatus controls the position of the write head based on the corrected write target position.

20 Claims, 17 Drawing Sheets

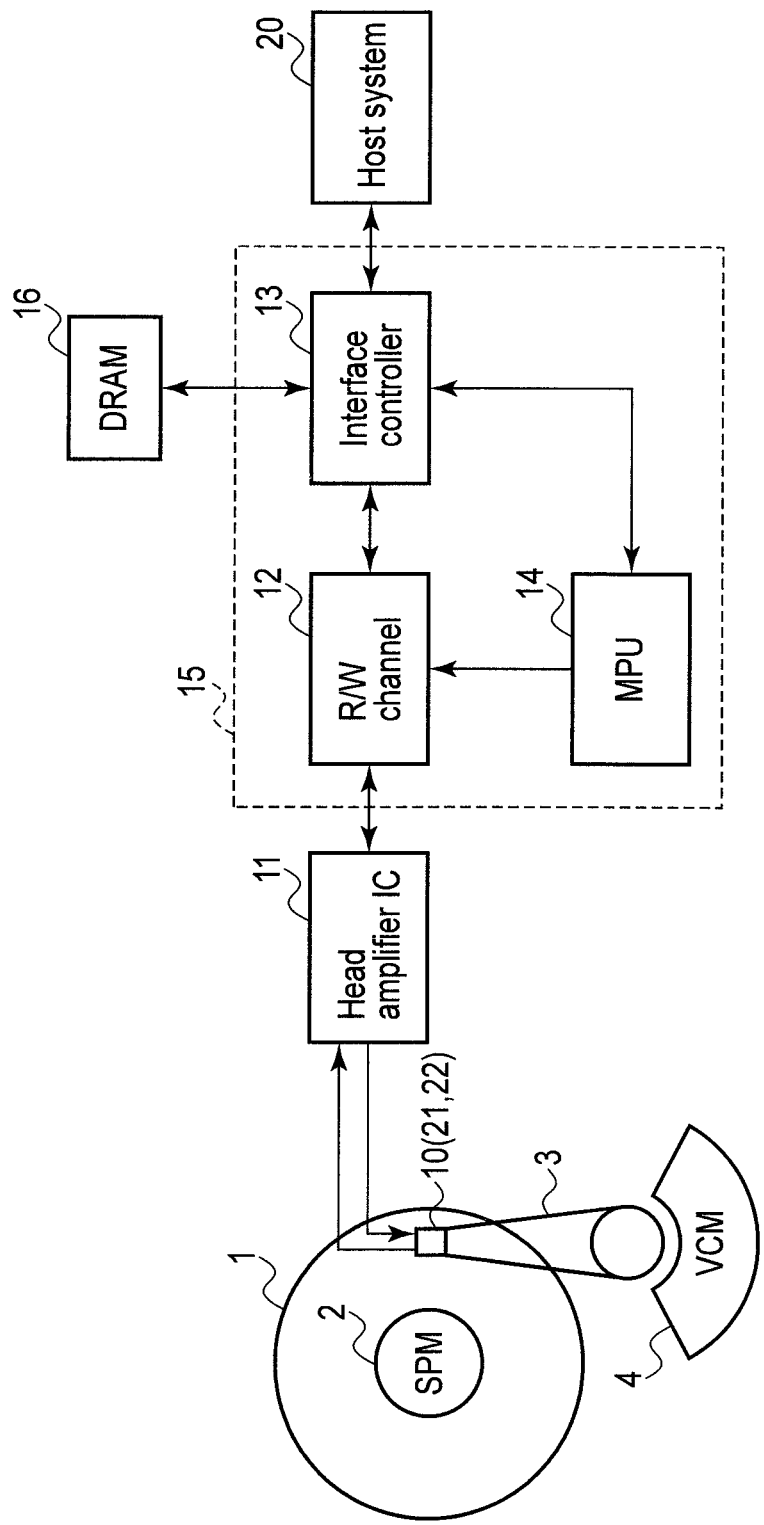
F I G. 1

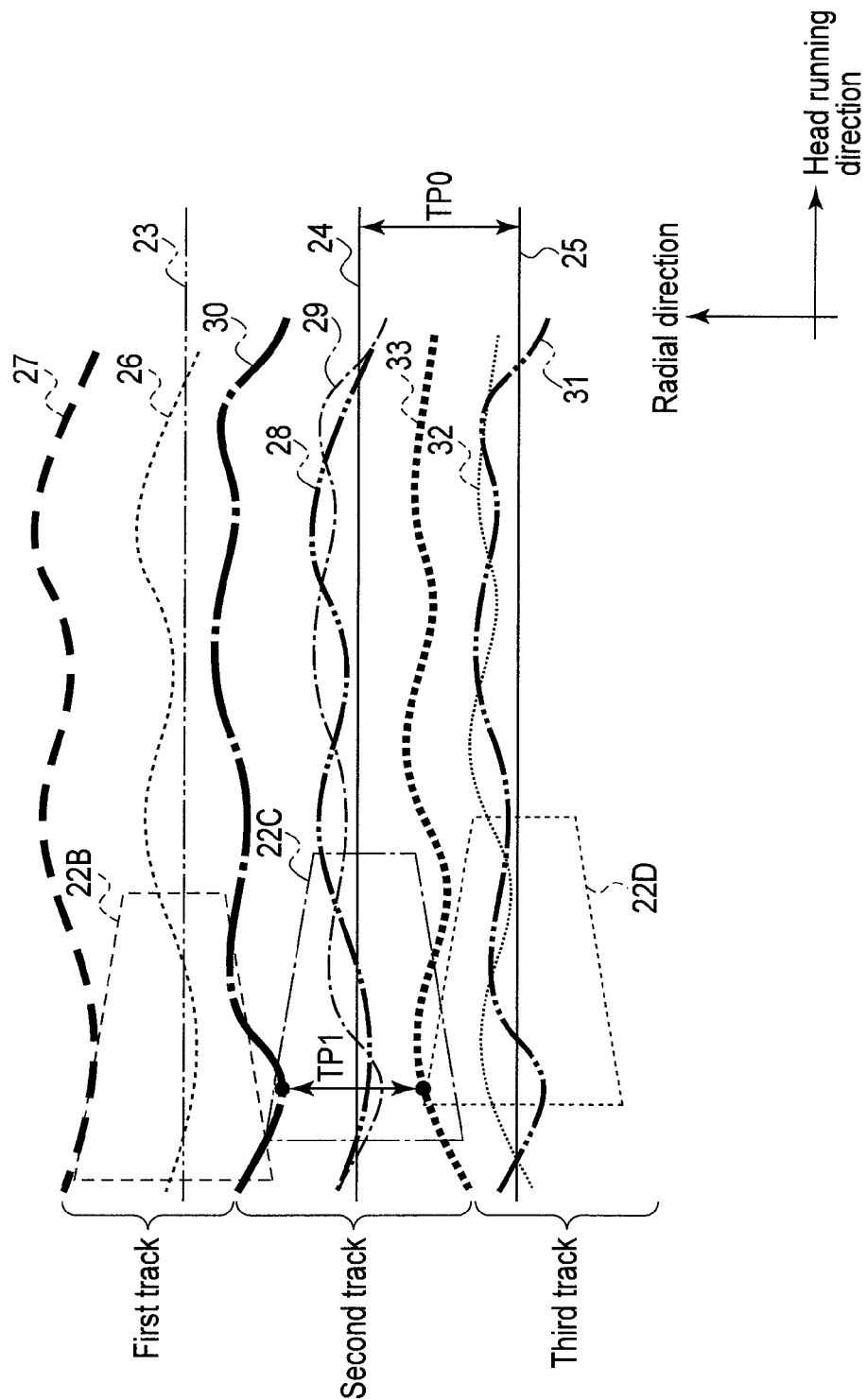
F I G. 2

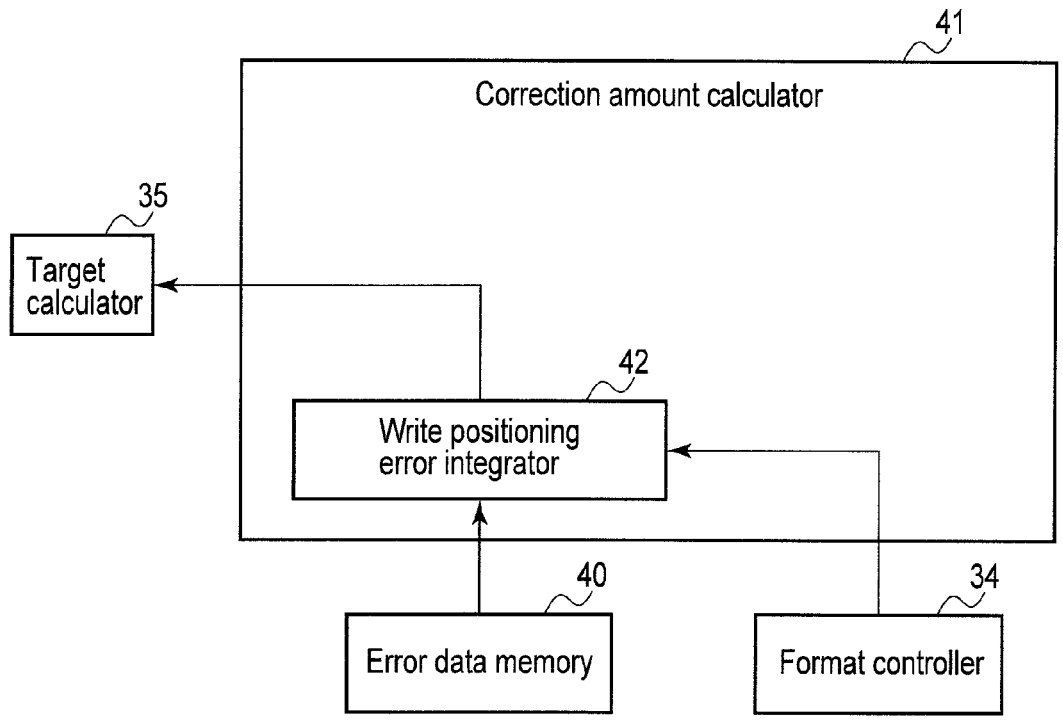
F I G. 4
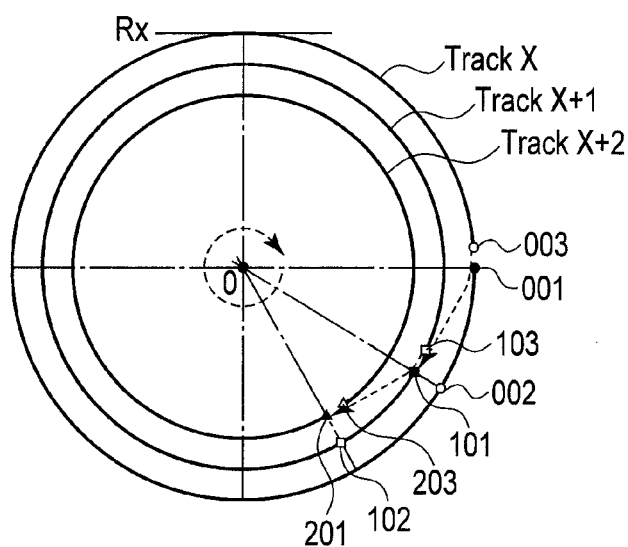
F I G. 5

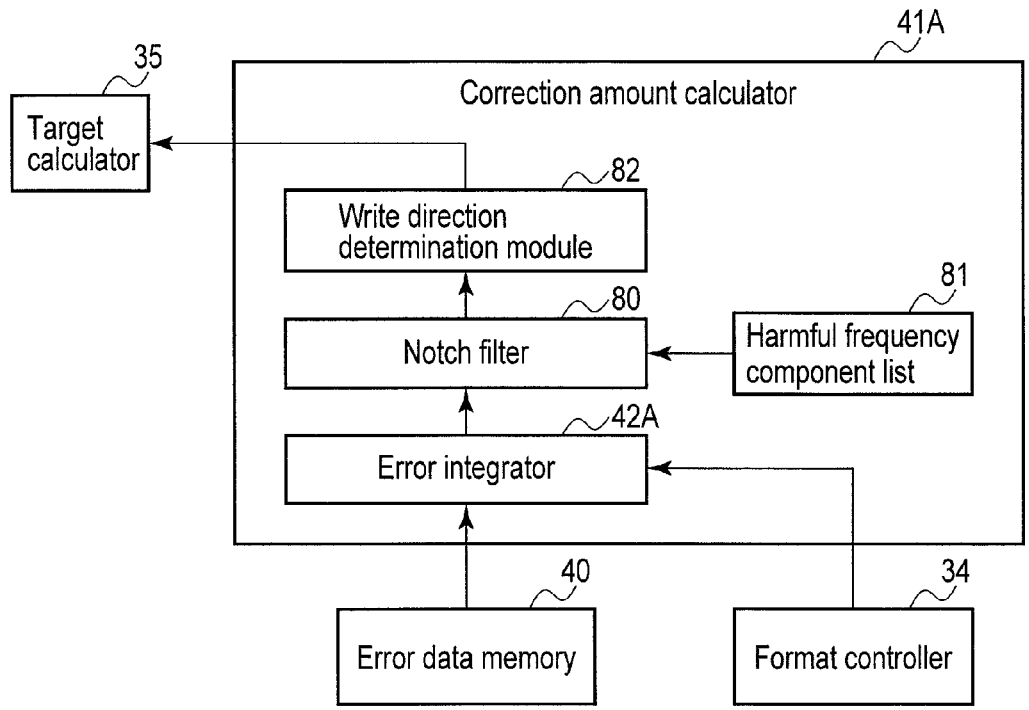
F I G. 8
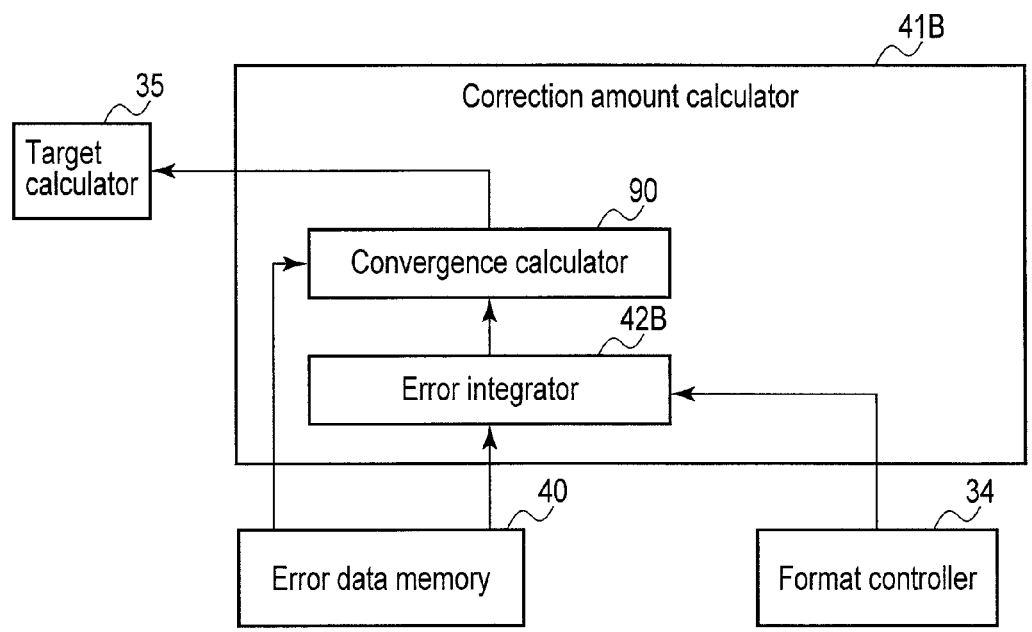
F I G. 9

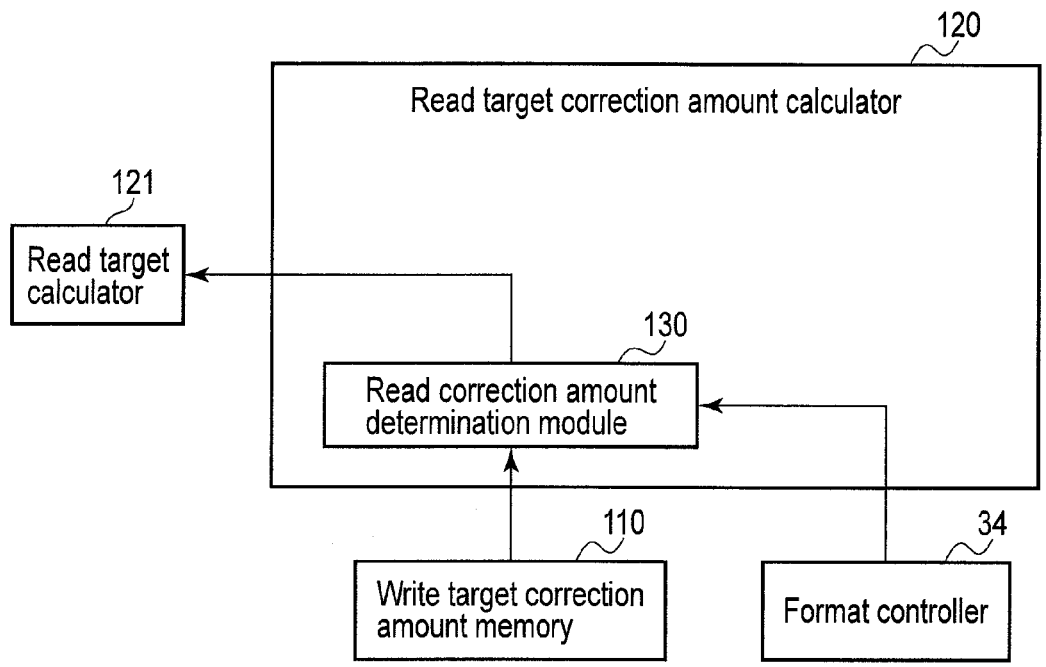
F I G. 14
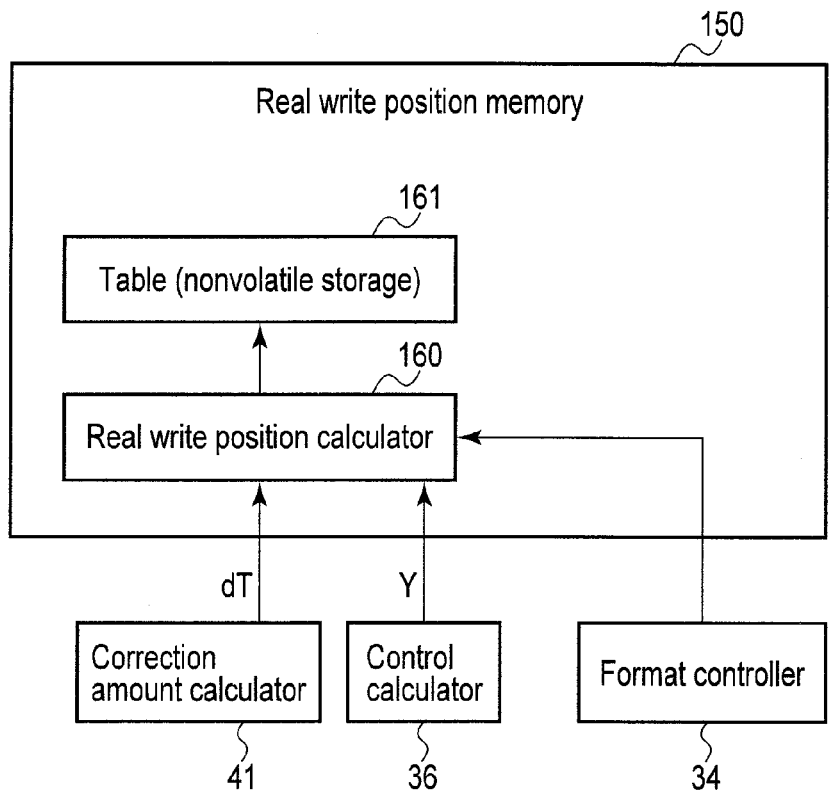
F I G. 17

INFORMATION WRITE APPARATUS AND INFORMATION WRITE METHOD

CROSS-REFERENCE TO RELATED APPLICATIONS

This application is based upon and claims the benefit of priority from Japanese Patent Application No. 2012-239489, filed Oct. 30, 2012, the entire contents of which are incorporated herein by reference.

FIELD

Embodiments described herein relate generally to an information write apparatus and information write method being able to write tracks.

BACKGROUND

Recently, a technique for writing tracks on a magnetic disk in the high density has been developed. This technique is, e.g., a shingled write recording technique of writing tracks with being partially overlapped with each other. By using this shingled write recording technique, it is possible to write tracks in the high density (write data in tracks in the high density).

It is required to not only write tracks in the high density, but also accurately write tracks. By accurately writing tracks, it is possible to prevent the destruction of data already written on tracks.

Since tracks are written by a write head, however, it is necessary to reduce positioning errors of the write head in order to accurately write tracks. Unfortunately, positioning errors of the write head are affected by a disturbance or the like, and this makes positioning errors of the write head difficult to reduce.

Also, if a track is written in a position shifted from a desired position, the shifted written track must be rewritten. This rewrite may destroy already written tracks or decrease the write speed.

BRIEF DESCRIPTION OF THE DRAWINGS

FIG. 1 is an exemplary view showing a configuration of a magnetic disk apparatus according to a first embodiment.

FIG. 2 is an exemplary view for explaining an outline of the first embodiment.

FIG. 4 is an exemplary view showing a configuration of a correction amount calculator of the magnetic disk apparatus according to the first embodiment.

FIG. 5 is an exemplary view for explaining tracks written on a magnetic disk incorporated to the magnetic disk apparatus according to the first embodiment.

FIG. 8 is an exemplary view showing a configuration of a correction amount calculator of a magnetic disk apparatus according to a second embodiment.

FIG. 9 is an exemplary view showing a configuration of a correction amount calculator of a magnetic disk apparatus according to a third embodiment.

FIG. 14 is an exemplary view showing a configuration of a read target correction amount calculator of the magnetic disk apparatus according to the fifth embodiment.

FIG. 17 is an exemplary view showing a configuration of a real write position memory of the magnetic disk apparatus according to the seventh embodiment.

DETAILED DESCRIPTION

Figure 3:
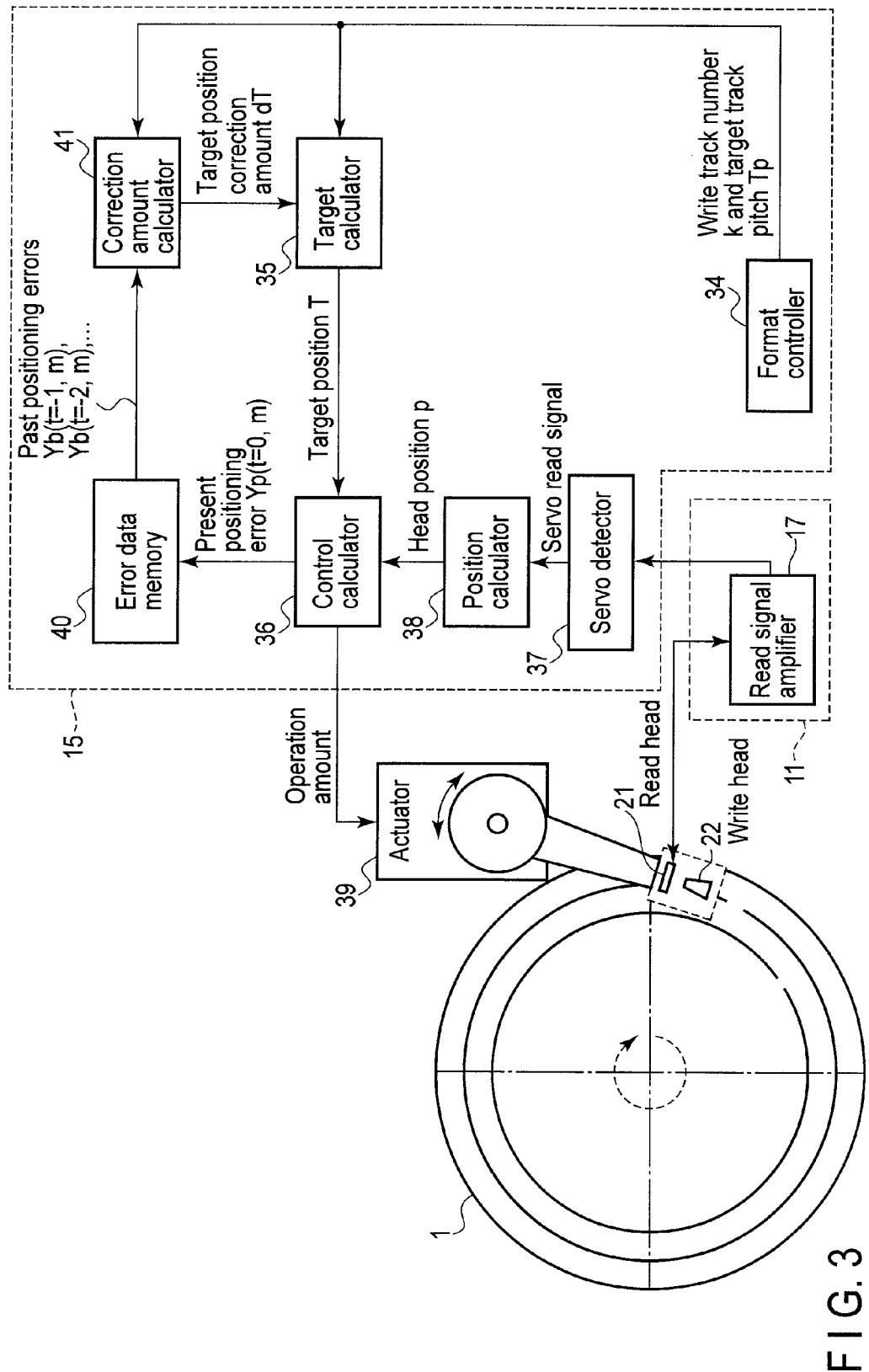
FIG. 3 is an exemplary view showing a detailed configuration of the magnetic disk apparatus according to the first embodiment.

In general, according to one embodiment, an information write apparatus includes a write head, a read head, a target position calculation module, a head position calculation module, a positioning error calculation module, a memory, a correction module, and a control module. The write head writes a track on a magnetic disk by a shingled write recording method. The read head reads a read signal from the track. The target position calculation module calculates a write target position of the track based on a pitch between the track and a track adjacent to the track. The head position calculation module calculates a position of the write head based on a servo read signal in the read signal. The error calculation module calculates a positioning error for each sector of the track based on the write target position and the position of the write head. The memory stores the calculated positioning error in association with each sector. The correction module, when writing a predetermined track, integrates, for each sector, positioning errors of tracks written before the predetermined track is written, and corrects a write target position of the predetermined track based on the integrated positioning error of each sector. The control module controls the position of the write head based on the corrected write target position of the predetermined track, when writing the predetermined track.

First Embodiment

FIG. 1 is a block diagram showing the main components of a magnetic disk apparatus according to the first embodiment.

As shown in FIG. 1, the magnetic disk apparatus generally includes a head-disk assembly (HDA), a head amplifier integrated circuit (to be referred to as a head amplifier IC hereinafter) 11, and a hard disk controller (HDC) 15.

The HDA includes a magnetic disk 1 as a recording medium, a spindle motor (SPM) 2, an arm 3 on which a head 10 is mounted, and a voice coil motor (VCM) 4. The spindle motor 2 rotates the magnetic disk 1. The arm 3 and VCM 4 form an actuator. When driven by the VCM 4, the actuator moves the head 10 mounted on the arm 3 to a designated position on the magnetic disk 1.

The head 10 includes a slider as a main body, and a read head 21 and write head 22 mounted on the slider. The read head 21 reproduces (reads) tracks on the magnetic disk 1. The write head 22 records (writes) tracks on the magnetic disk 1.

The head amplifier IC 11 includes a preamplifier and write driver. The preamplifier amplifies a read signal read by the read head 21, and transmits the signal to a read/write (R/W) channel 12. The write driver transmits, to the write head 22, a write current corresponding to write data output from the R/W channel 12.

The HDC 15 is a one-chip integrated circuit including the R/W channel 12, an interface controller 13, and a microprocessor (MPU) 14. The R/W channel 12 includes a read channel to execute read data signal processing, and a write channel to execute write data signal processing.

The interface controller 13 controls data transfer between a host system 20 and the R/W channel 12.

The MPU 14 is a main controller of the magnetic disk apparatus, and executes servo control for positioning the head 10 by controlling the VCM 4. Also, the MPU 14 designates the execution of, e.g., a write target correction amount calculation to be described in detail later.

Before explaining details of the configuration of the first embodiment, an outline of the first embodiment will be explained with reference to FIG. 2.

In the first embodiment, tracks are written on the magnetic disk 1 by a write method (to be referred to a shingled write recording method hereinafter) using the shingled write recording technique.

The shingled write recording method is a write method of writing tracks like shingles by decreasing the track pitch so that adjacent tracks on the magnetic disk 1 partially overlap each other. High density tracks can be written by sequentially writing adjacent tracks so as to partially overlay the tracks on each other. Therefore, the storage capacity of the magnetic disk 1 can be increased. Also, in the shingled write recording method, tracks are written for every track group as an aggregate of a plurality of tracks.

The magnetic disk apparatus controls the write head 22 such that the central position of the write head is positioned on a positioning (write) target orbit. The target orbit is, e.g., an orbit (to be referred to as a track center orbit hereinafter) indicating the center of each predetermined track. However, a positioning error occurs between the target orbit and a real write orbit as an orbit indicating the central position of the write head 22 having actually run. Note that the position is represented by the radius in a given direction from the center of the magnetic disk 1. Note also that the orbit is represented based on the position of one round of the magnetic disk 1.

Examples of the positioning error are a repeatable run out caused by, e.g., a shift of prewritten servo data, and a non-repeatable run out as a control residue produced based on, e.g., a vibration occurring with respect to a control system due to a disturbance or the like. The sum of the repeatable run out and non-repeatable run out macroscopically forms a normal distribution. Also, if the target orbit is the track central orbit, positioning errors of each track are distributed independently of other tracks. Furthermore, when using the shingled write recording method, adjacent tracks are sequentially written, so the distance between adjacent tracks is equal to the track pitch. Therefore, assuming that a positioning error variation standard deviation (to be simply referred to as a standard deviation hereinafter) σpos is s (nm), a standard deviation σtp of the distance between adjacent tracks is s×√2 due to the additivity of variations of two normally distributed values. Accordingly, the standard deviation of the distance between adjacent tracks is represented by $$\sqrt{2}s \tag{1}$$

That is, σtp is larger than σpos. This increases the frequency of contraction by which the track pitch becomes smaller than a predetermined track pitch TP0. This contraction decreases the signal-to-noise ratio (SNR) when reading written tracks.

In the first embodiment, an uncorrected target orbit is the track central orbit of each track. This track central orbit is corrected based on a positioning error of a track written before a predetermined track is written. More specifically, the target orbit is corrected based on the position of a track already written in a direction corresponding to a predetermined sector of a track to be written. The track is written on the corrected target orbit. Note that "direction" means the direction from the center of the magnetic disk 1 to a predetermined position of the magnetic disk 1.

An outline of the correction of the target orbit in the first embodiment will be explained below with reference to FIG. 2.

FIG. 2 shows an example in which tracks are written in the order of first, second, and third tracks. The first track is a track written on the outer circumference of the magnetic disk 1, and the third track is a track written on the inner circumference of the magnetic disk 1. Note that each track is shown as a write area between the edges of adjacent tracks in FIG. 2, but each track may also be a write area at a predetermined pitch TP0 in the radial direction from the track central orbit as a center.

First, when writing the first track, there is no track written before the first track, so the position of a write head 22B is controlled by using a track central orbit 23 of the first track as a target track without correcting the target orbit. The write head 22B is controlled so that the central position of the write head 22B runs on the track central orbit 23, but a positioning error as described above occurs. Therefore, an orbit drawn by the central position of the write head 22B is indicated by a real write orbit 26 crossing the track central orbit 23. Also, as shown in FIG. 2, the write head 22B has a predetermined width in the radial direction. When the write head 22B runs on the real write orbit 26, therefore, the edge on the outer circumference of the write head 22B is a track edge 27.

Then, when writing the second track, the second track is written based on a positioning error of the first track written before the second track. More specifically, a track central orbit 24 is corrected to a target orbit 28 of the second track along the real write orbit 26. The target orbit 28 is an orbit which is parallel to the real write orbit 26 and the target orbit 28 is an orbit that the expected value of the average distance between the track edges becomes the predetermined track pitch TP0. The average distance between tracks when determining the target orbit 28 is the distance between the real write orbit 26 and target orbit 28 in the radial direction. The positioning error of the first track is the distance between target orbit 23 and real write orbit 26 in the radial direction. In case that the position of a write head 22C is controlled with respect to the target orbit 28, a real write orbit 29 crossing the target orbit 28 is obtained. As shown in FIG. 2, the real write orbit 29 is shifted from the target orbit 28 by the positioning error. This shift is the positioning error of the second track. In other words, the positioning error of the second track is the distance between the target orbit 28 and real write orbit 29 in the radial direction. Also, when the write head 22C runs on the real write orbit 29, the edge on the outer circumference of the write head 22C is a track edge 30.

Thus, the target orbit 28 is corrected to become an orbit formed along the real write orbit 26 as described above. More specifically, the target orbit 28 is corrected from the track central orbit 24 so that the distance between the track central orbit 24 and target orbit 28 is equal to the positioning error of the first track. The target orbit 28 may also be corrected from the real write orbit 26 such that an orbit obtained by moving the real write orbit 26 parallel toward the inner circumference by the track pitch TP0 becomes the target orbit 28.

Subsequently, when writing the third track, the third track is written based on the positioning error of the second track written before the third track. More specifically, a target orbit 31 of the third track is determined so that the target orbit 31 of the third track is formed along the real write orbit 29. The target orbit 31 is an orbit which is parallel to the real write orbit 29 and the target orbit 31 is an orbit that the expected value of the average distance between tracks becomes the track pitch TP0. The average distance between tracks when determining the target orbit 31 is the distance between the real write orbit 29 and target orbit 31 in the radial direction. The positioning error of the second track is the distance between the track central orbit 24 of the second track and the real write orbit 29 in the radial direction. When the position of a write head 22D is controlled with respect to the target orbit 31, a real write orbit 32 crossing the target orbit 31 is obtained. Also, when the write head 22D runs on the real write orbit 32, the edge on the outer circumference of the write head 22D becomes a track edge 33.

Thus, the target orbit 31 is corrected to become an orbit formed along the real write orbit 29 as described above. More specifically, the target orbit 31 is corrected from the track central orbit 25 so that the distance between the track central orbit 25 and target orbit 31 is equal to the positioning error of the second track. The target orbit 31 may also be corrected from the real write orbit 29 such that an orbit obtained by moving the real write orbit 29 parallel toward the inner circumference by the track pitch TP0 becomes the target orbit 31.

As described above, when the target orbit is corrected based on the positioning error, tracks can be written so as not to produce any portion that may cause contraction as described above. It is also possible to write tracks by narrowing a portion having a large track pitch. This makes it possible to suppress track pitch variations. The positioning error standard deviation $\sigma$pos of a track is obtained based on the positioning error standard deviation of an already written track. Assuming that $\sigma$pos is s (nm), therefore, the standard deviation $\sigma$tp of the distance between tracks can be decreased from $\sqrt{2}$s [nm] as the value of the conventional art indicated by expression (1) to s (nm).

A detailed configuration of the first embodiment will be explained below with reference to FIG. 3.

The detailed configuration of the first embodiment is included in the head amplifier IC 11 and HDC 15 as shown in FIG. 1. Referring to FIG. 3, the head amplifier IC 11 includes a read signal amplifier 17. Also, the HDC 15 includes a format controller 34, target calculator 35, control calculator 36, servo detector 37, position calculator 38, error data memory 40, and correction amount calculator 41.

First, a head position p is obtained. A servo pattern signal read by the read head 21 is supplied to the read signal amplifier 17. The read signal amplifier 17 is connected to the control calculator 36 via the servo detector 37 and position calculator 38. The read signal amplifier 17 amplifies a read signal containing the servo pattern signal. The servo detector 37 detects the servo pattern signal from the amplified read signal containing the servo pattern signal. The position calculator 38 receives the servo pattern signal detected by the servo detector 37, as a servo read signal. Based on this servo read signal, the position calculator 38 quantifies the position of the head 10. The position calculator 38 supplies the quantified position of the head 10 as the head position p to the control calculator 36.

Then, a write target position T is obtained. The write target position T is the write target position of the write head 22 on the magnetic disk 1. For example, the write target position T is a position for representing the target orbit as described above. The format controller 34 is connected to the control calculator 36 via the target calculator 35. The target calculator 35 calculators the write target position T in accordance with an instruction with regard to a track number k to be written and a target track pitch Tp. Note that the target track pitch Tp is, e.g., a pitch between a predetermined track and a track adjacent to the predetermined track. Based on the pitch between the predetermined track and adjacent track, the target calculator 35 can calculate the write target position of the predetermined track. The format controller 34 is also connected to the target calculator 35 via the correction amount calculator 41. The format controller 34 supplies, to the correction amount calculator 41, an instruction with regard to the track number k to be written and the target track pitch Tp. The target calculator 35 is connected to an actuator 39 via the control calculator 36. Based on the head position p and the write target position T supplied from the target calculator 35, the control calculator 36 calculates a positioning error Y of the write head 22 with respect to the write target position T. The control calculator 36 is connected to the correction amount calculator 41 via the error data memory 40. The control calculator 36 supplies the positioning error Y to the error data memory 40. Note that the positioning error Y calculated by the control calculator 36 is a positioning error Y (to be referred to as a present positioning error Y hereinafter) with regard to a track currently being written. Also, based on the write target position T, the control calculator 36 calculates an operation amount necessary to operate the write head 22. The actuator 39 performs positioning of the write head 22 based on the operation amount output from the control calculator 36.

The write target position T calculated by the target calculator 35 will be described below. The write target position T is a write target position corrected based on a target position correction amount dT. The target position correction amount dT is obtained based on a positioning error Yb (to be referred to as a past positioning error Yb hereinafter) of an already written track. Note that if there is no past positioning error Yb, an uncorrected write target position itself is used as the write target position T. The error data memory 40 stores a present positioning error Yp supplied from the control calculator 36 and/or the past positioning error Yb. Note that the present positioning error Yp stored in the error data memory 40 is stored as the past positioning error Yb in the error data memory 40 when, e.g., a new track is written and the present positioning error Yp of the written new track is calculated. The error data memory 40 is connected to the target calculator 35 via the correction amount calculator 41. The correction amount calculator 41 calls the past positioning error Yb from the error data memory 40. Based on the past positioning error Yb, the correction amount calculator 41 calculates the target position correction amount dT. The correction amount calculator 41 supplies the target position correction amount dT to the target calculator 35. Note that in FIG. 3, the present positioning error Yp(t=0,m) is the present positioning error Yp corresponding to a servo sector m of track 0. The past positioning error Yb(t=−1,m) is the past positioning error Yp corresponding to a servo sector m of track −1. Track −1 is a track written before track 0 is written, e.g., a track written immediately before track 0 is written. The past positioning error Yb(t=−2,m) is the past positioning error Yp corresponding to a servo sector m of track −2. Track −2 is a track written before track −1 is written, e.g., a track written two tracks before track 0.

The functions of the modules shown in FIG. 3 can be implemented by software. Note that the functions of the modules shown in FIG. 3 can also be implemented by hardware such as a dedicated LSI or DSP.

Next, a detailed configuration of the correction amount calculator 41 will be explained with reference to FIG. 4.

The correction amount calculator 41 includes a write positioning error integrator 42. The write positioning error integrator 42 is connected to the format controller 34, error data memory 40, and target calculator 35. The write positioning error integrator 42 receives, from the format controller 34, an instruction concerning the track number k to be written and the target track pitch Tp. In accordance with this instruction, the write positioning error integrator 42 calls, from the error data memory 40, the past positioning errors Yb in the same direction as that of a predetermined sector of the track number k. The write positioning error integrator 42 integrates the called past positioning errors Yb. The write positioning error integrator 42 supplies the integrated past positioning error Yb to the target calculator 35.

Figure 6:
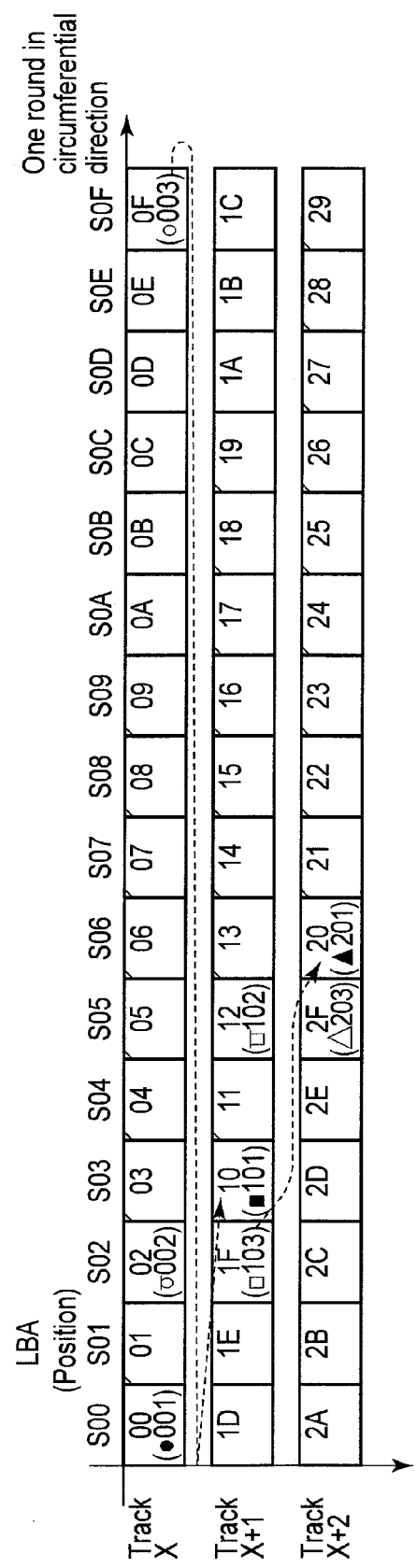
FIG. 6 is an exemplary view for explaining addresses of tracks written by the magnetic disk apparatus according to the first embodiment.

A more practical quantitative operation will be explained below with reference to FIGS. 5 and 6.

FIG. 5 shows the write positions for a plurality of tracks on the magnetic disk 1.

Referring to FIG. 5, tracks X, X+1, and X+2 are written in this order. Also, it is assumed that each of the tracks X, X+1, and X+2 are written at the track pitch Tp0 by the shingled write recording method. First, write is started from position 001 on the track X. Note that a write start radius is Rx. The track X is written clockwise on the radius Rx to position 003 on the track X. Then, the track X+1 is written. The track X+1 is written clockwise on the track X+1 from position 101 to position 103 on the track X+1. After that, the track X+2 is written clockwise on the track X+2 from position 201 to position 203 on the track X+2. Thus, when writing adjacent tracks, the physical write start position of a track is shifted, whenever the process advances by one track, by an amount corresponding to the seek time as a necessary positioning time between tracks. For example, as shown in FIG. 5, the write start position of the track X+1 is shifted by a time required for the head 10 to move from position 003 on the track X to position 101 on the track X+1.

More detailed write positions between tracks will now be explained with reference to FIG. 6.

Each track includes, e.g., 16 servo sectors (S00 to S0F). FIG. 6 shows that LBA (00 to 2F) of three rounds is allocated to each servo sector. Thus, the LBA of each track is represented by a hexadecimal number. First, the track X is written from an area represented by LBA 00 of the servo sector S00 to an area represented by LBA 0F of the servo sector S0F of the track X. Then, as indicated by an arrow in FIG. 6, the head 10 moves from the area represented by LBA 0F of the servo sector S0F to an area represented by LBA 10 of the servo sector S03. The track X+1 is first written from LBA 10 of the servo sector S03 to LBA 10 of the servo sector S0F, and then written from LBA 1D of the servo sector S00 to LBA 1F of the servo sector S02. As indicated by an arrow in FIG. 6, the head 10 moves from LBA 1F of the servo sector S02 to LBA 20 of the servo sector S06. The track X+2 is first written from LBA 20 of the servo sector S06 to LBA 29 of the servo sector S0F, and then written from LBA 2A of the servo sector S00 to LBA 2F of the servo sector S05. Thus, each track produces a shift (track skew) of three servo sectors (3 LBA) whenever the process advances by one track. However, the correction amount calculator 41 calculates the target position correction amount dT based on the past positioning error Yb in the same direction as that of a predetermined sector of the track. For example, when calculating the target position correction amount dT for LBA 21 of the track X+2, the correction amount calculator 41 calculates the target position correction amount dT for LBA 21 based on the past positioning error Yb with regard to LBA 14 of the track X+1 and/or LBA 07 of the track X+1.

A more quantitative calculation of the target position correction amount dT will be explained below with reference to FIG. 6. That is, the calculation of a target position correction amount dT(n,m) for a track n and servo sector Sm (m=00 to 0F) when writing data in order from LBA 00 will be explained. Since no past positioning error Yb exists for a write start track n=X, the track X is written with zero correction amount by setting dT(X,00)=dT(X,01)= . . . =dT(X,0F)=0. Also, the error data memory 40 stores present positioning errors Yp(X,00), Yp(X,01), . . . , Yp(X,0F) of the each of servo sectors. For a track n=X+1 next to the write start track X, a past positioning error Yb(X,m) of the write start track X with regard to the servo sector Sm is known. Therefore, dT(X+1, m) equals Yb(X,m) by using the past positioning error Yb(X, m) of the track X. For a next track n=X+2, T (X+2,m) equals Yb(n−1,m)+Yb(n−2,m). For a track n=X+k after the track n=X+2, the target position correction amount is calculated by $$dT(X+k,m) = \sum_{w=X}^{X+k-1} Y(w,m) \qquad (2)$$

In FIG. 3, the correction amount calculator 41 refers to the past positioning errors Yb(n−1,m), Yb(n−2,m), . . . stored in the error data memory 40 for the kth track. The correction amount calculator 41 integrates the past positioning errors Yb(n−1,m), Yb(n−2,m), . . . , and calculates the target position correction amount dT.

Note that the error data memory 40 can store the positioning errors Y in associated with the sectors of all tracks, and can also store a positioning error obtained by integrating the past positioning errors Yb in the same direction. This makes it possible to reduce the memory amount required to store the position error Y.

Figure 7:
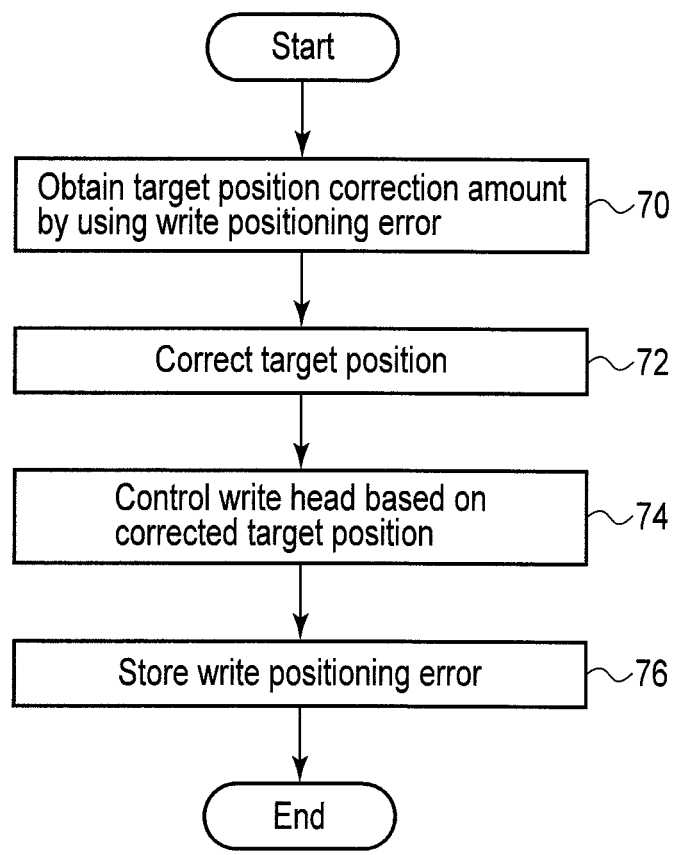
FIG. 7 is an exemplary flowchart showing a write target correction processing sequence in the magnetic disk apparatus according to the first embodiment.

The procedure of processes of correcting and controlling the positioning error in the first embodiment will be explained below with reference to FIG. 7.

When receiving the instruction as described above from the format controller 34 in block 70, the correction amount calculator 41 calculates the target position correction amount dT by using the past positioning error Yb. In block 72, the target calculator 35 corrects the target position T by using the target position correction amount dT. In block 74, the control calculator 36 performs a process of controlling the write head 22 based on the corrected target position T. In block 76, the control calculator 36 causes the error data memory 40 to store the present positioning error Yp obtained from the position of the write head 22 controlled based on the corrected target position T, and from the corrected target position T.

In the first embodiment as explained above, the target position T of a predetermined track can be corrected based on positioning error of tracks written before the predetermined track is written. It is also possible to correct the target position T of the predetermined track by integrating, for each sector, the past positioning errors Yb in the same direction. Furthermore, tracks can be written by avoiding contraction by dynamically changing the write target position T for, e.g., each sector. By correcting the target orbit based on the positioning error, tracks can be written so as not to form any portion that may cause contraction. In addition, tracks can be written by narrowing a portion where the track pitch is large. Consequently, track pitch variations can be suppressed. This makes it possible to decrease the standard deviation of the distance between tracks to approximately s (nm).

Second Embodiment

In the second embodiment, it will be explained below with reference to the accompanying drawings.

Note that an explanation of the same functions and configurations as those of the first embodiment will be omitted.

In the second embodiment, a target position correction amount dT is calculated by suppressing error propagation by a notch filter. "Error propagation" is a phenomenon in which when the vibration of a target orbit resonates with a resonance frequency such as a mechanical resonance frequency, a positioning error increases or diverges in a specific direction due to integral error propagation, and as a consequence the positioning error propagates.

More specifically, the configuration of a correction amount calculator 41A according to the second embodiment will be explained below with reference to FIG. 8. The correction amount calculator 41A includes a write positioning error integrator 42A, notch filter 80, harmful frequency component list 81, and write direction determination module 82.

The notch filter 80 is connected to the write positioning error integrator 42A and harmful frequency component list 81. The notch filter 80 suppresses a specific harmful frequency component obtained based on past positioning error of one round of an arbitrary track (track w), which are integrated by the write positioning error integrator 42A, by referring to a harmful frequency component list. Note that the past positioning error of one round of the arbitrary track (track w) are represented by $$\{\Sigma_{w=X}^{X+k-1} Y(w,0x00), \Sigma_{w=X}^{X+k-1} Y(w,0x01), \ldots, \Sigma_{w=X}^{X+k-1} Y(w,0x10)\} \quad (3)$$

The write positioning error integrator 42A not only integrates the past positioning error Yb of a predetermined sector of an arbitrary track, but also integrates past positioning errors Yb for each sector if an arbitrary track has a plurality of sectors. The notch filter 80 is connected to a target calculator 35 via the write direction determination module 82. The notch filter 80 supplies, to the write direction determination module 82, the result of the suppression performed on the specific harmful frequency component by the notch filter 80. Based on this result of the suppression, the write direction determination module 82 determines the direction of a servo sector to be written, and calculates the target position correction amount dT of the direction. The write direction determination module 82 supplies the target position correction amount dT of the determined direction to the target calculator 35.

Note that the notch filter 80 transforms the frequency, by FFT, of an orbit obtained by the past positioning error Yb of one round of a predetermined track, and then suppresses a specific frequency band component. After that, the notch filter 80 may also perform inverse FFT. Alternatively, the notch filter 80 can be an FIR filter. Note that if the harmful frequency component list 81 contains a plurality of specific frequency band components, the notch filter 80 may also suppress one of specific frequency band components.

In the second embodiment as explained above, the write target position of a track to be written can be corrected by removing a predetermined frequency component from frequency components obtained from a positioning error of an already written track. By removing the predetermined frequency component, error propagation induced by resonance can be suppressed. Read errors can be reduced by suppressing error propagation. Note that a read error occurs when, e.g., the read head 21 performing a read operation runs on a track on which write position correction exceeding a read offset margin is performed. It is also possible to reduce positioning failures occurring when the real write orbit of a predetermined track excessively zigzags in one direction. Furthermore, the target position correction amount dT does not become much larger than the track pitch TP0 write radial region as the center of the track central orbit. This makes it possible to prevent already written nearby tracks from being destroyed.

Note that the configuration of the second embodiment can be combined with the configuration of the first embodiment.

Third Embodiment

In the third embodiment, it will be explained below with reference to the accompanying drawings.

Note that an explanation of the same functions and configurations as those of the first or second embodiment will be omitted.

In the third embodiment, a correction amount calculator 41B has a convergence calculating function of limiting a target position correction amount dT derived from a past positioning error Yb in order to suppress error propagation as described above.

Details of the third embodiment will be explained with reference to FIG. 9.

The correction amount calculator 41B includes a write positioning error integrator 42B and convergence calculator 90. The convergence calculator 90 is connected to the error data memory 40, the write positioning error integrator 42B, and the target calculator 35.

The convergence calculator 90 calculates the target position correction amount dT from equation (4) below having a limiting term represented by a function f, by using a past positioning error Yb supplied from the error data memory 40, and a past positioning error Yb integrated by the write positioning error integrator 42B.

$$dT(X+k,m) = \Sigma_{w+X}^{X+k-1} Y(w,m) + f(X+k,m) \quad (4)$$

The function f is represented by, e.g., equation (5) below.

$$f(X+k,m) = \begin{cases} 0, & \left|\sum_{w=X}^{X+k-1} Y(w,m)\right| < Y\max \\ -\sum_{w=X}^{X+k-1} Y(w,m) + Y\max, & \sum_{w=X}^{X+k-1} Y(w,m) \geq Y\max \\ +\sum_{w=X}^{X+k-1} Y(w,m) - Y\max, & \sum_{w=X}^{X+k-1} Y(w,m) \leq Y\max \end{cases} \quad (5)$$

When applying equation (5) to the function f, the absolute value of the past positioning error Yb is limited to an upper limit Ymax or an lower limit Ymax. If the absolute value of the past positioning error Yb exceeds the upper limit Ymax, the past positioning error Yb is fixed to Ymax (or −Ymax). This makes it possible to suppress a predetermined increase or more in target position correction amount dT.

Equation (6) below may also be used as the function f.

$$f(X+k, m) = \begin{cases} -\sum_{w=X}^{X+k-1} Y(w, m) \cdot \\ \frac{\beta}{n} \sum_{z=X+k-n+1}^{X+k-1} Y(Z, m) - Y(Z-1, m), & \sum_{w=X}^{X+k-1} Y(w, m) \geq 0 \\ +\sum_{w=X}^{X+k-1} Y(w, m) \cdot \\ \frac{\beta}{n} \sum_{z=X+k-n+1}^{X+k-1} Y(Z, m) - Y(Z-1, m), & \sum_{w=X}^{X+k-1} Y(w, m) \leq 0 \end{cases} \quad (6)$$

A convergence calculation is performed by applying equation (6) to the function f, monitoring, for a predetermined sector m of a track currently being written, the tendency of the past positioning error Yb of a track already written n tracks earlier in the same direction as that of the predetermined sector. A convergence calculation is performed by suppressing the gain β in proportion to the rate at which the target position correction amount dT increases. Consequently, if the target position correction amount dT abruptly increases in one direction with respect to the track written n tracks earlier, the target position correction amount dT can be suppressed. This makes it possible to prevent the target position correction amount dT from continuously having a tendency to increase. When compared to equation (5), the use of equation (6) has the advantage that the past positioning error Yb is not abruptly limited. β in equation (6) is a suppression degree. As the suppression degree β increases, the target position correction amount dT is more suppressed. Note that Y (Z,m)−Y (Z−1,m) of equation (6) is a positioning error changing amount of a predetermined number of tracks.

In third embodiment as explained above, the write target position of a predetermined track can be corrected within the range over which the target position correction amount dT of the predetermined track does not exceed a preset upper limit or a preset lower limit. Also, the write target position of a predetermined track can be corrected based on positioning error changing amounts of a predetermined number of tracks written before the predetermined track is written.

Note that the configuration of the third embodiment can be combined with the configuration of the first or second embodiment. For example, the configurations of the second and third embodiments can be combined by inputting the output result from the write direction determination module 82 as shown in FIG. 8 to the write positioning error integrator 42B as shown in FIG. 9. In this case, note that the target calculator 35 as shown in FIG. 9 is not used. By combining the configurations of the second and third embodiments, it is possible to, e.g., further limit the integrated past positioning error Yb after a predetermined frequency component is suppressed by the notch filter 80.

Fourth Embodiment

The fourth embodiment will be explained below with reference to the accompanying drawing.

Note that an explanation of the same functions and configurations as those of the first, second, or third embodiment will be omitted.

In the fourth embodiment, a track group (band) is formed by grouping a plurality of tracks to be written by the shingled write recording method, and the influence of error propagation is suppressed by setting a predetermined value as the width of a gap area between bands. More specifically, after a predetermined band is written, the control calculator 36 changes the operation amount of an actuator 39 so that the width of a gap area between bands is larger than the width of track. Consequently, the width of the gap area between the bands is set to a predetermined value.

A write area to be written by the shingled write recording method is divided into a plurality of bands so that a portion of a written storage area can be rewritten. Also, a gap area corresponding to a width Hw of a write head 22 in the radial direction is formed between bands. The width of the gap area is made equal to or larger than the sum of the width Hw and a maximum target position correction amount dT, e.g., Ymax in equation (5), which can be produced by error propagation assumed when one band is completely written. This makes it possible to reduce the possibility that an adjacent band is overwritten due to error propagation.

More specifically, the layout of bands on a magnetic disk 1 will be explained below with reference to FIG. 10.

Figure 10:
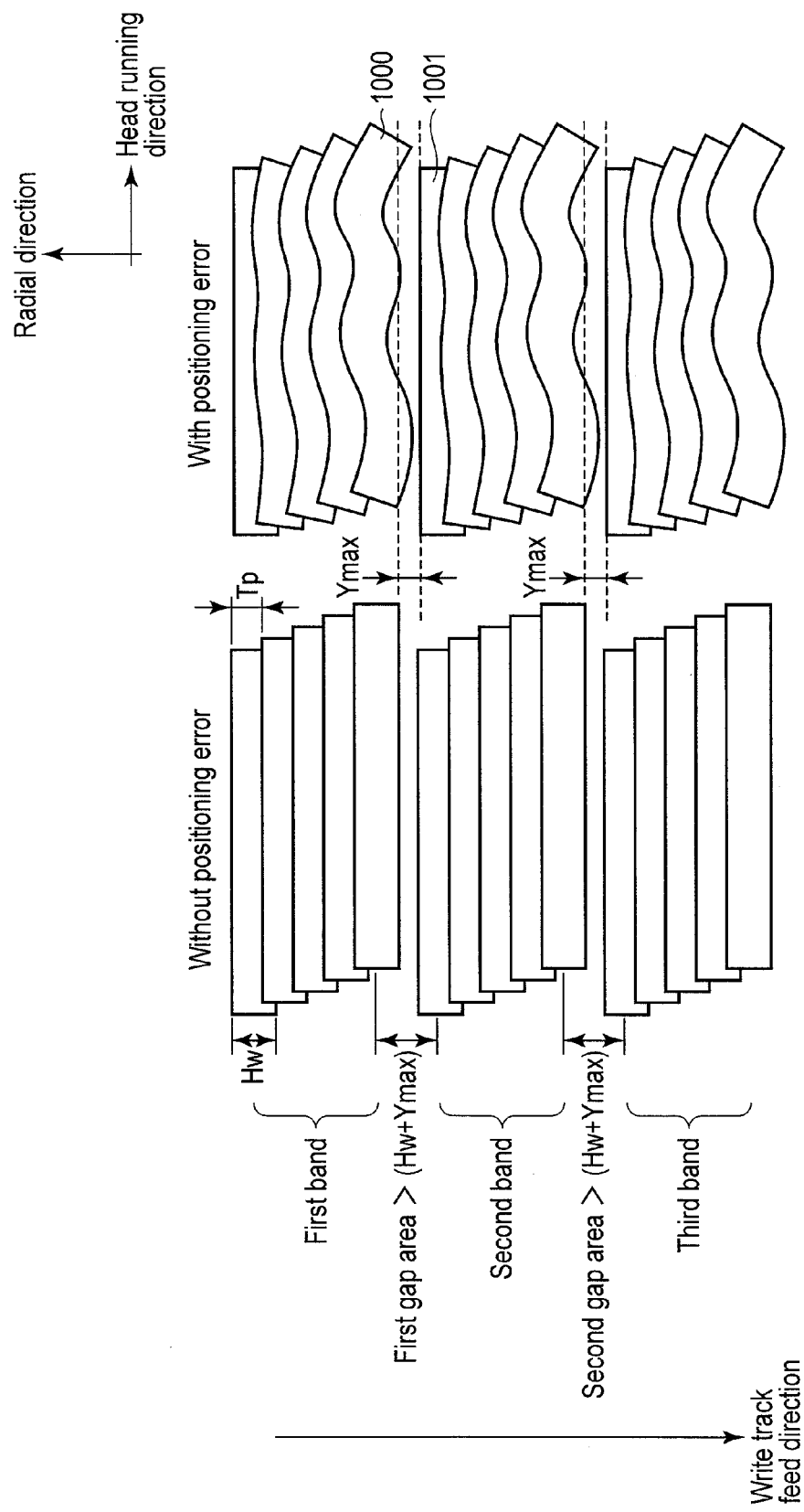
FIG. 10 is an exemplary view for explaining an outline of a fourth embodiment.

FIG. 10 assumes that first, second, and third bands are written in this order. Also, the left side of FIG. 10 has no positioning error Y, and the right side of FIG. 10 has a positioning error Y.

When there is no positioning error Y, tracks of each band are not shifted when they area written, so the width of the gap area need only be Hw. However, if the width of the gap area is Hw when the positioning error Y exists, an adjacent band may be overwritten. For example, track 1001 to be written first in a second band may be overwritten on track 1000 written last among a plurality of tracks of a first band.

In the fourth embodiment, the width in the radial direction of the gap area between bands is set to be equal to or larger than the sum of Hw and Ymax in equation (5). If a positioning error is Ymax, therefore, tracks are not overwritten between bands.

Note that the value of Ymax in the fourth embodiment need not be the same as that of Ymax in the third embodiment.

Note also that the configuration of the fourth embodiment can be combined with the configuration of the first, second, or third embodiment.

In the fourth embodiment as explained above, when writing a plurality of track groups, a target position T of a predetermined track is corrected within the range over which the correction amount of the target position T of the predetermined track does not exceed a preset upper limit. Therefore, the position of the write head 22 is controlled such that the distance between a plurality of track groups in the radial direction is equal to or larger than the sum of the upper limit and the width of the write head 22 in the radial direction on the magnetic disk 1. This decreases the possibility that tracks are overwritten between track groups.

Fifth Embodiment

The fifth embodiment will be explained below with reference to the accompanying drawings.

Note that an explanation of the same functions and configurations as those of any of the first to fourth embodiments will be omitted.

In the fifth embodiment, a read target position Tr of the read head 21 during read is corrected by using the target position correction amount dT calculated during write.

Figure 11:
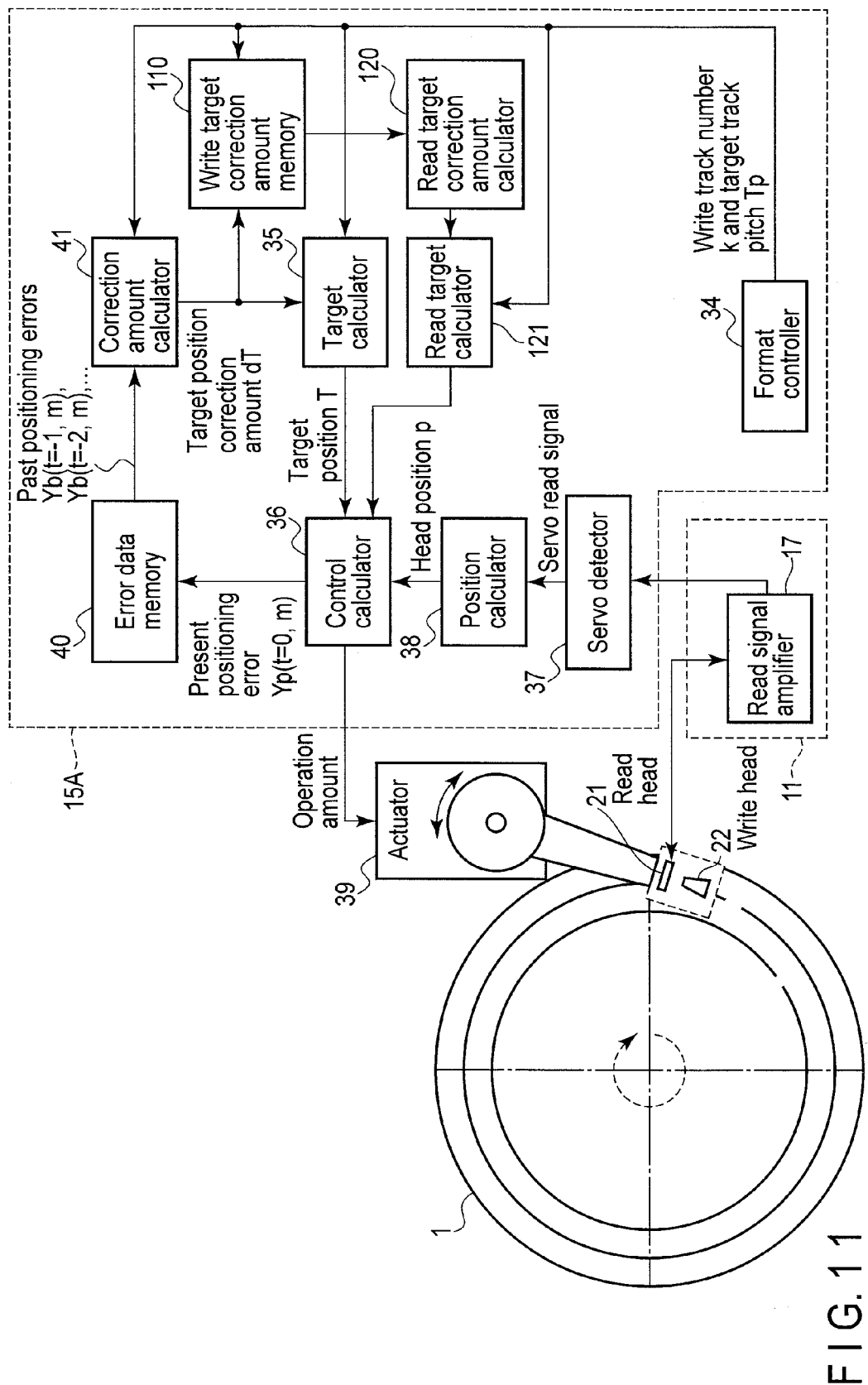
FIG. 11 is an exemplary view showing a configuration of a magnetic disk apparatus according to a fifth embodiment.

FIG. 11 shows the entire configuration of the fifth embodiment. In the fifth embodiment, a magnetic disk apparatus is a magnetic write/read apparatus including a configuration for writing tracks and an configuration for reading tracks, as shown in FIG. 11. The configuration for writing tracks in the magnetic write/read apparatus as shown in FIG. 11 and the configuration for reading tracks in the magnetic write/read apparatus as shown in FIG. 11 will separately be explained below.

Figure 12:
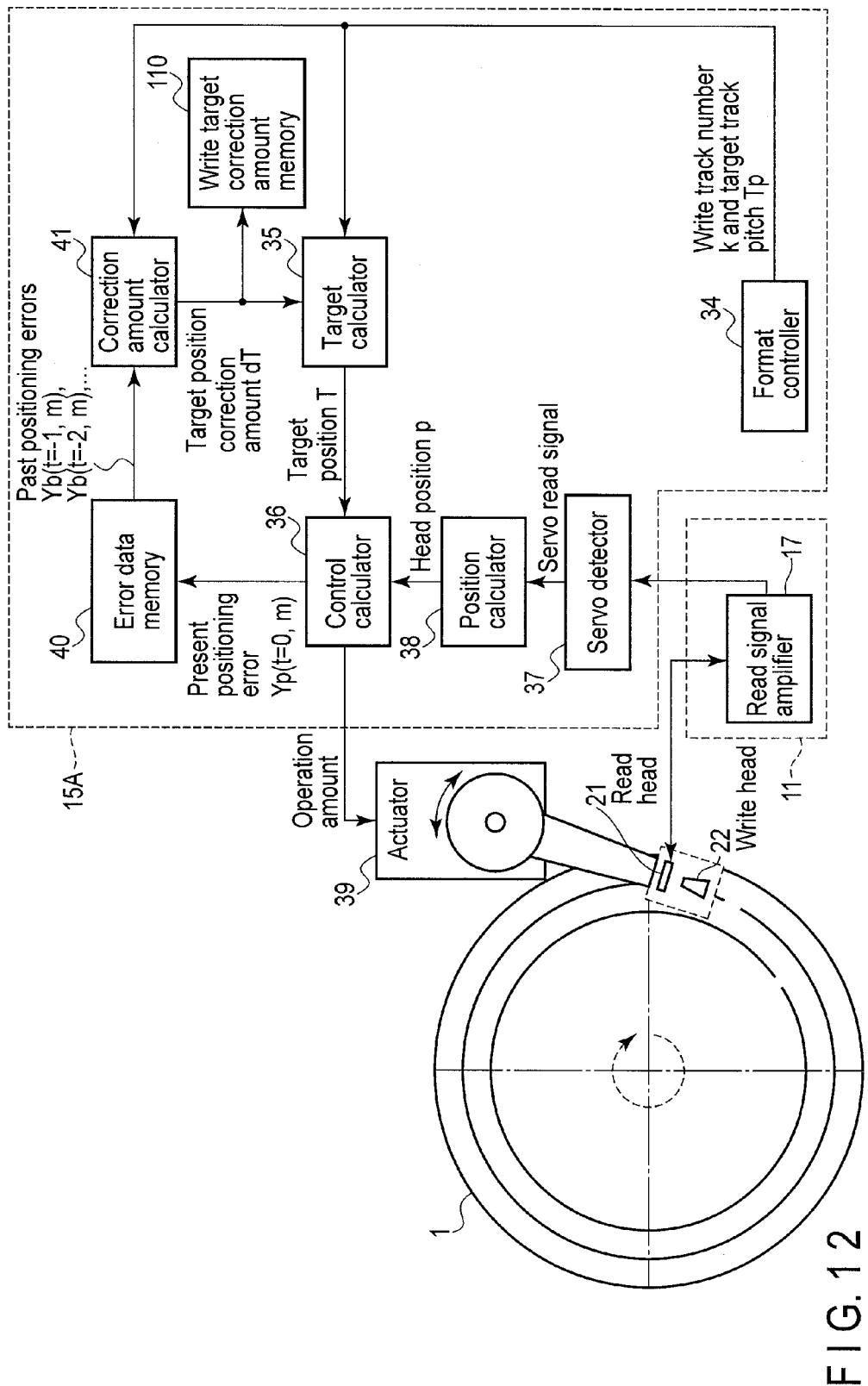
FIG. 12 is an exemplary view showing a configuration for write of the magnetic disk apparatus according to the fifth embodiment.

FIG. 12 shows the configuration for write in the fifth embodiment. A write target correction amount memory 110 stores a target position correction amount dT calculated by the correction amount calculator 41. The write target correction amount memory 110 can store the target position correction amount dT without integrating the target position correction amount dT in associated with each sector, and can also store the target position correction amount obtained by integrating the target position correction amount dT of a sector of a track already written in a predetermined direction.

Figure 13:
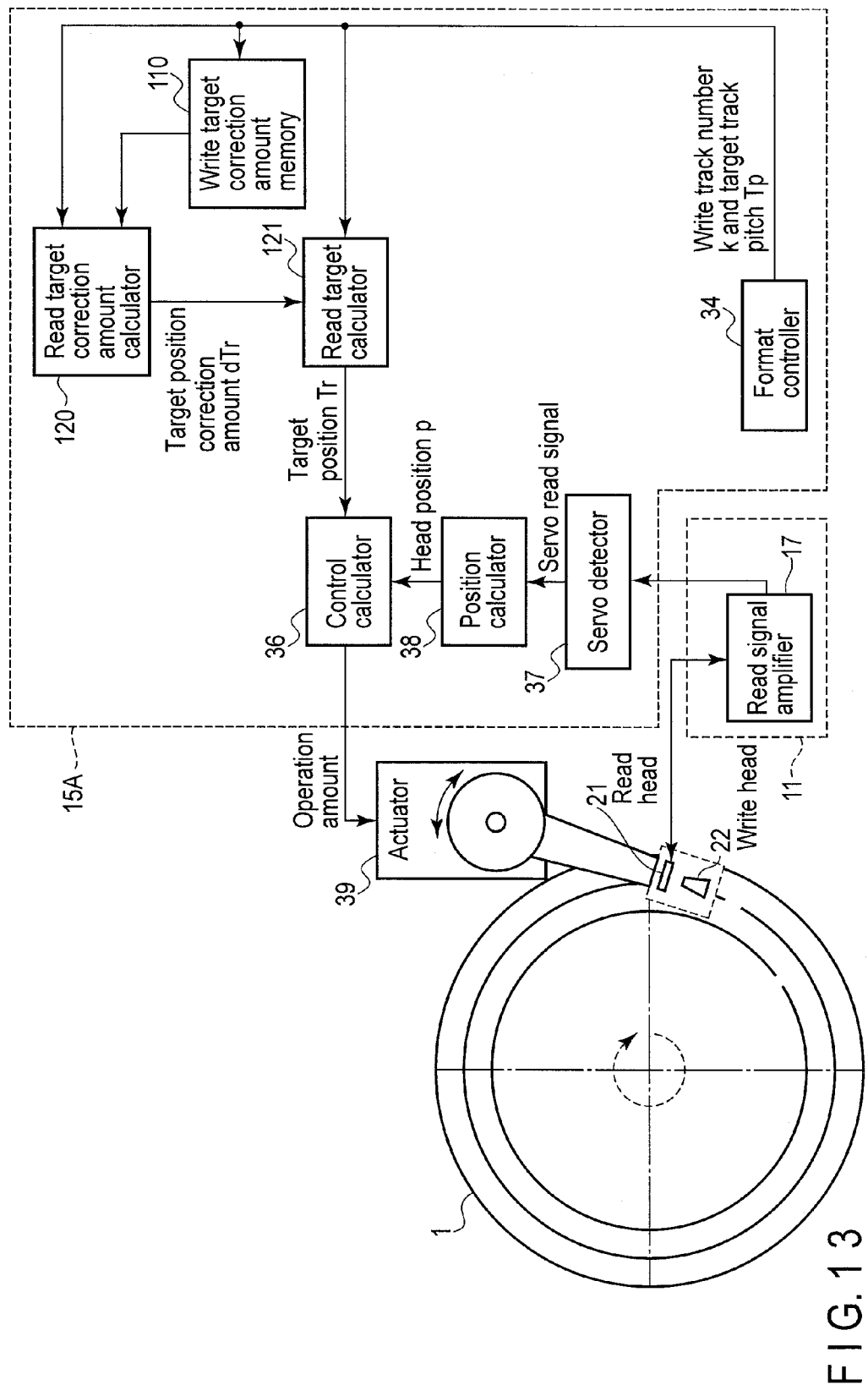
FIG. 13 is an exemplary view showing a configuration for read of the magnetic disk apparatus according to the fifth embodiment.

FIG. 13 shows the configuration for read in the fifth embodiment. A read target calculator 121 is connected to the write target correction amount memory 110 via a read target correction amount calculator 120. The read target calculator 121 is also connected to the format controller 34 and control calculator 36. In accordance with an instruction from the format controller 34, the write target correction amount memory 110 supplies the target position correction amount dT at the time of write of a write track number k to the read target correction amount calculator 120. Based on the target position correction amount dT at the time of write of the write track number k, the read target correction amount calculator 120 calculates a read target position correction amount dTr. The read target calculator 121 corrects a predetermined read target position based on the read target position correction amount dTr, and supplies the corrected read target position Tr to the control calculator 36.

Next, a detailed configuration of the read target correction amount calculator 120 will be explained with reference to FIG. 14.

The read target correction amount calculator 120 includes a read correction amount determination module 130. The read correction amount determination module 130 determines the read target position correction amount dTr in accordance with the direction of a servo sector of a track to be read.

Note that the configuration of the fifth embodiment can be combined with the configuration of any of the first to fourth embodiments.

In the fifth embodiment as explained above, the read target position Tr for a predetermined track can be corrected when the track is read, based on the target position correction amount dT of that track when it is written. The position of the read head 21 can be controlled based on the corrected read target position Tr of the predetermined track. Consequently, even when write position correction exceeding a read offset margin is performed during write, the track center can be read more accurately by performing read position correction for positioning during read, and this can increase the read SNR. Note that even when the write position correction amount does not exceed the read offset margin, the track center can be read more accurately by performing read along a write position correction orbit, and this can increase the read SNR.

Sixth Embodiment

The sixth embodiment will be explained below with reference to the accompanying drawing.

Note that an explanation of the same functions and configurations as those of any of the first to fifth embodiments will be omitted.

In the sixth embodiment, data of a target position correction amount dT is stored in a write sector at the end of a track written last in a written band. Consequently, even if a period of time from writing a track to reading the track is long, the read target position Tr can be corrected for positioning when reading the track by using the data of the target position correction amount dT during read.

The data of the target position correction amount dT must be held until the track is read. Accordingly, the target position correction amount dT must be stored in a nonvolatile storage medium. The data of the target position correction amount dT may be stored in a semiconductor nonvolatile memory such as an EEPROM. Since, however, a magnetic disk 1 is also a nonvolatile storage medium, it is desirable to store the data of the target position correction amount dT on the magnetic disk 1 from the viewpoint of the cost for data holding. Furthermore, when reading data at a predetermined position on the magnetic disk 1, if the data of the target position correction amount dT is stored in a physically separated place, a seek time is necessary to read the target position correction amount dT, and a positioning process for read is also necessary. This sometimes significantly decreases the transfer rate of the read process. Therefore, the data of the target position correction amount dT is desirably stored near a write position related to the target position correction amount dT. For the reasons as described above, the data of the target position correction amount dT is stored in the last write sector of the last written track of a written band.

More specifically, the storage location of the target position correction amount dT will be explained below with reference to FIG. 15.

Figure 15:
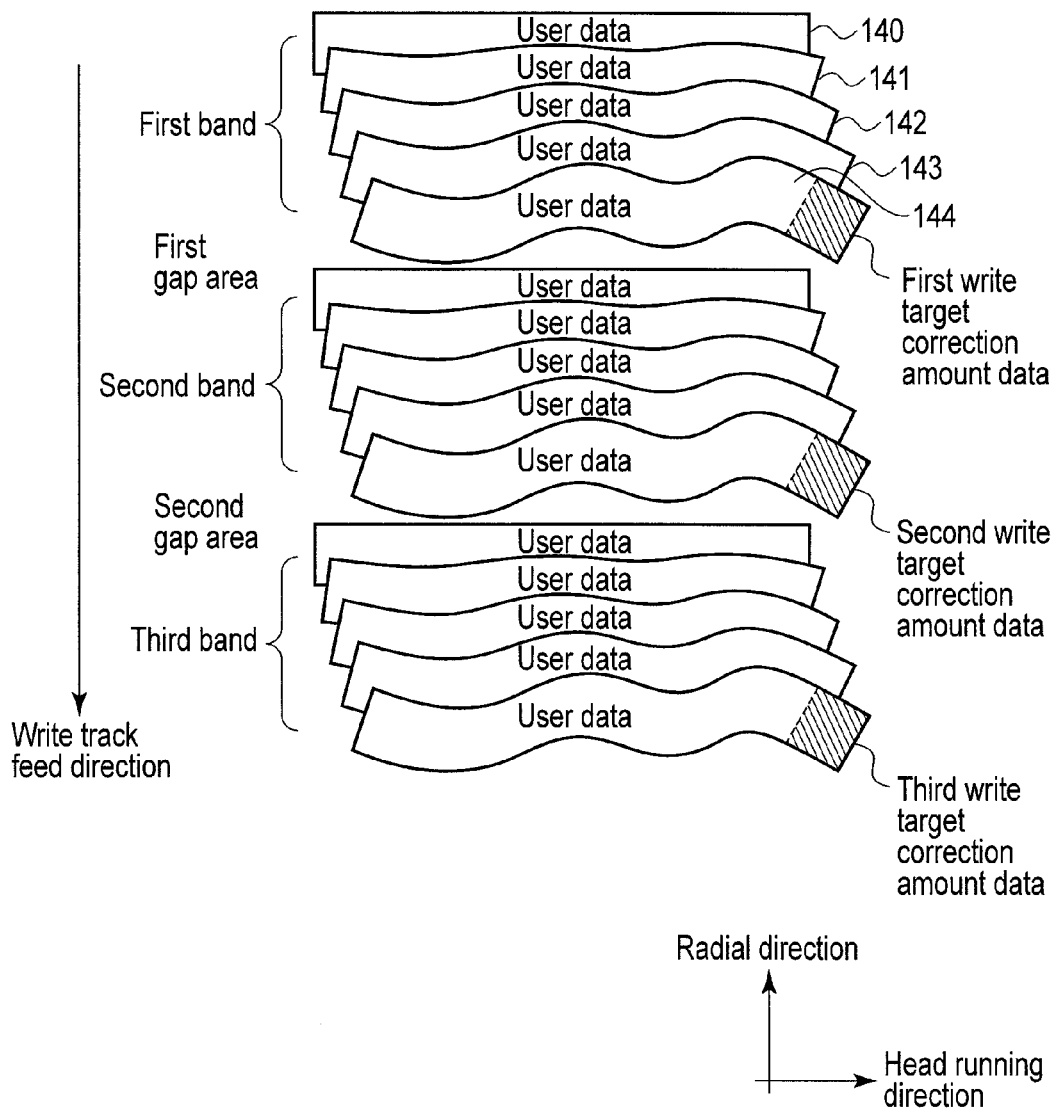
FIG. 15 is an exemplary view showing stored positions in tracks of write target correction amount data stored in a write target correction amount memory of a magnetic disk apparatus according to a sixth embodiment.

The data of the target position correction amount dT is stored in, e.g., each hatched portion shown in FIG. 15. In FIG. 15, it is assumed that first, second, and third bands are written in this order. Also, five tracks are written in order in each band. In the first band, for example, tracks 140, 141, 142, 143, and 144 are written in this order. Furthermore, the head 10 runs to the right in FIG. 15. Accordingly, the data of the target position correction amount dT with regard to the tracks written in the first band is stored as first write target correction amount data in the hatched portion shown in FIG. 15.

Note that the configuration of the sixth embodiment can be combined with the configuration of any of the first to fifth embodiments.

In the sixth embodiment as explained above, the write target position correction amount of a predetermined track is written in a sector at the end of each band. Therefore, a read process can be performed without significantly decreasing the transfer rate of the read process.

Seventh Embodiment

The seventh embodiment will be explained below with reference to the accompanying drawings.

Note that an explanation of the same functions and configurations as those of any of the first to sixth embodiments will be omitted.

In the seventh embodiment, a read target position Tr during read is corrected by using not only a target position correction amount dT but also a real write position in which a track is actually written. Consequently, the write track center can be positioned more accurately than when using only the target position correction amount dT.

Figure 16:
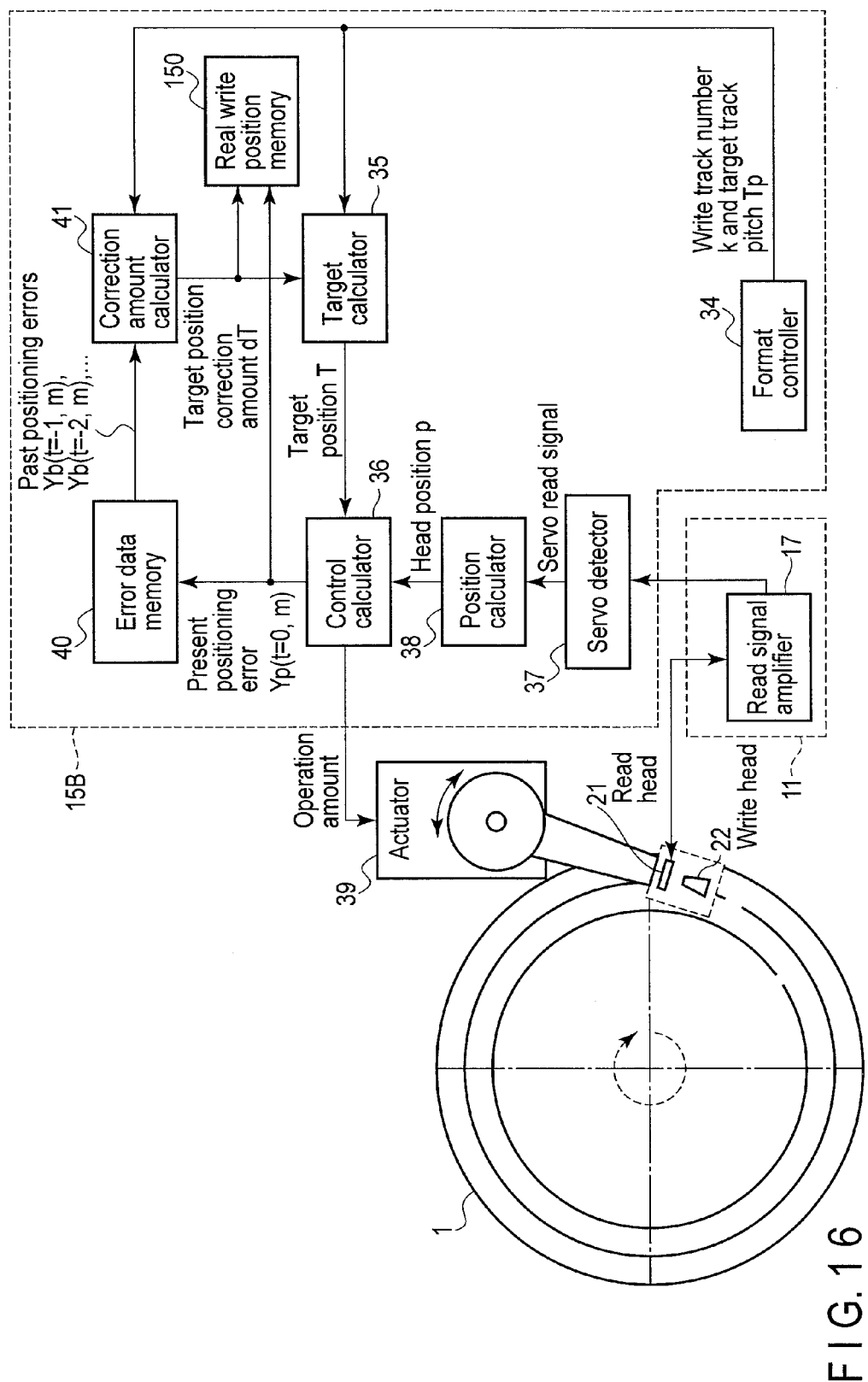
FIG. 16 is an exemplary view showing a configuration for write of a magnetic disk apparatus according to a seventh embodiment.

FIG. 16 shows a configuration for write in the seventh embodiment.

A real write position memory 150 stores the target position correction amount dT calculated by the correction amount calculator 41, and a present position error Yp calculated by the control calculator 36.

FIG. 17 shows a more detailed configuration of the real write position memory 150.

The real write position memory 150 includes a real write position calculator 160 and a nonvolatile table 161 being able to store data. The real write position calculator 160 is connected to the format controller 34, the control calculator 36, the correction amount calculator 41, and the table 161. The real write position calculator 160 calculates a real write position by adding the present position error Yp of a predetermined track to the target position correction amount dT of the predetermined track. The real write position calculator 160 writes data of the calculated real write position in the table 161.

Figure 18:
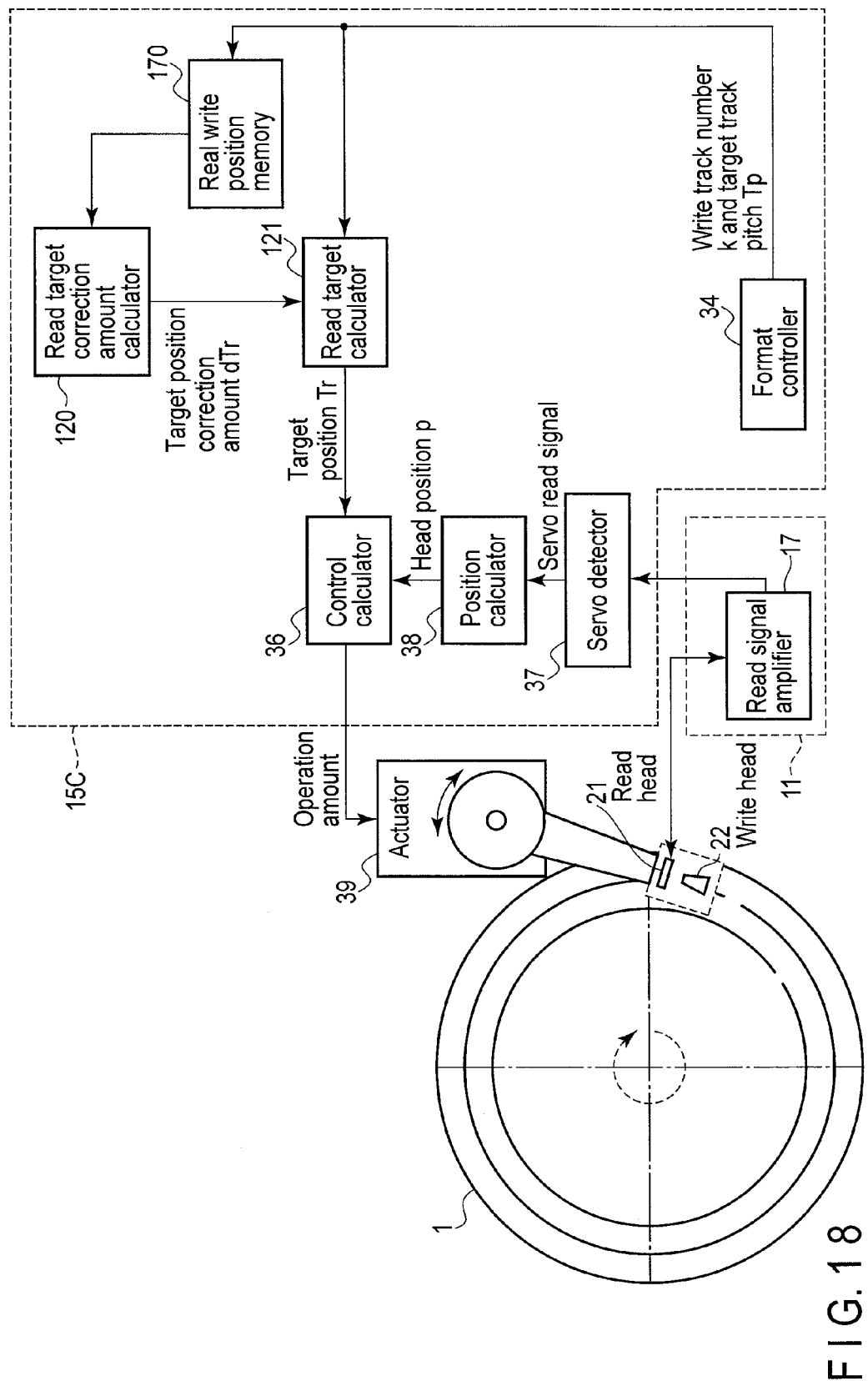
FIG. 18 is an exemplary view showing a configuration for read of the magnetic disk apparatus according to the seventh embodiment.

FIG. 18 shows a configuration for read in the seventh embodiment. In accordance with an instruction from the format controller 34, a real write position memory 170 supplies data of a real write position when a track of write track number k is written to a read target correction amount calculator 120.

Figure 19:
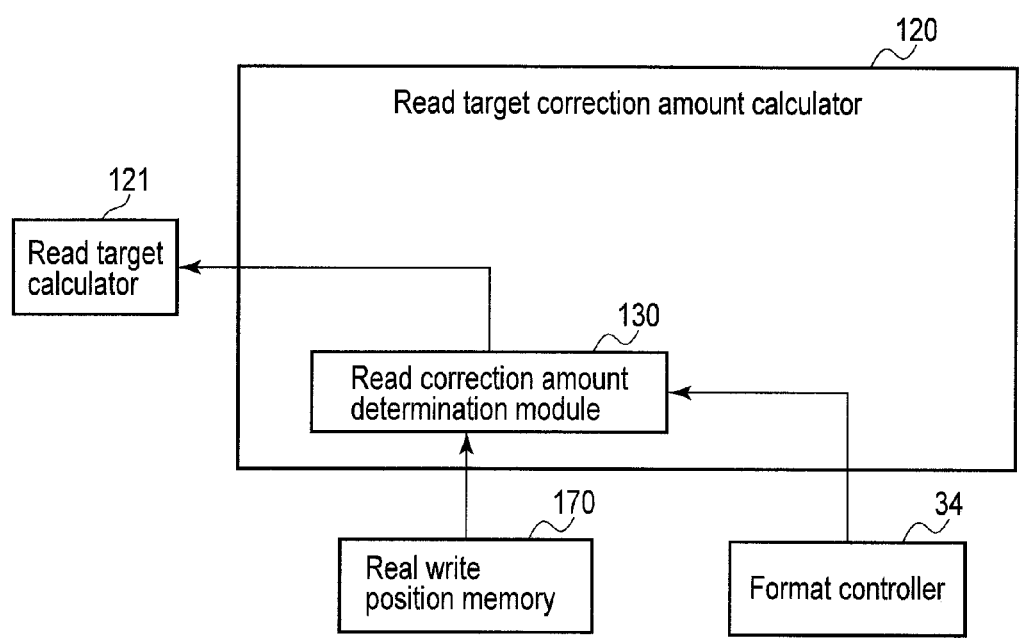
FIG. 19 is an exemplary view showing a configuration of a read target correction amount calculator of the magnetic disk apparatus according to the seventh embodiment.

A detailed configuration of the read target correction amount calculator 120 according to the seventh embodiment will be explained below with reference to FIG. 19.

The read target correction amount calculator 120 includes a read correction amount determination module 130. In accordance with the direction of a servo sector of a track to be read, the read correction amount determination module 130 determines a read target position correction amount dTr based on the read write position data supplied from the real write position memory 170. The read correction amount determination module 130 supplies the determined read target position correction amount dTr to the read target calculator 121.

Note that the configuration of the seventh embodiment can be combined with the configuration of any of the first to sixth embodiments.

In the seventh embodiment as explained above, the read target position of a predetermined track can be corrected based on the real write position of the track, and the position of the read head 21 can be controlled based on the corrected read target position of the predetermined track. This makes it possible to increase the read SNR.

Eighth Embodiment

The eighth embodiment will be explained below with reference to the accompanying drawing.

Note that an explanation of the same functions and configurations as those of any of the first to seventh embodiments will be omitted.

In the eighth embodiment, real write position data is stored in a write sector at the end of a track written last in a written band. Note that the reason why the real write position data is stored in a write sector at the end of a track is the same as that described previously with reference to FIG. 15.

More specifically, the storage location of the real write position data will be explained below with reference to FIG. 20.

Figure 20:
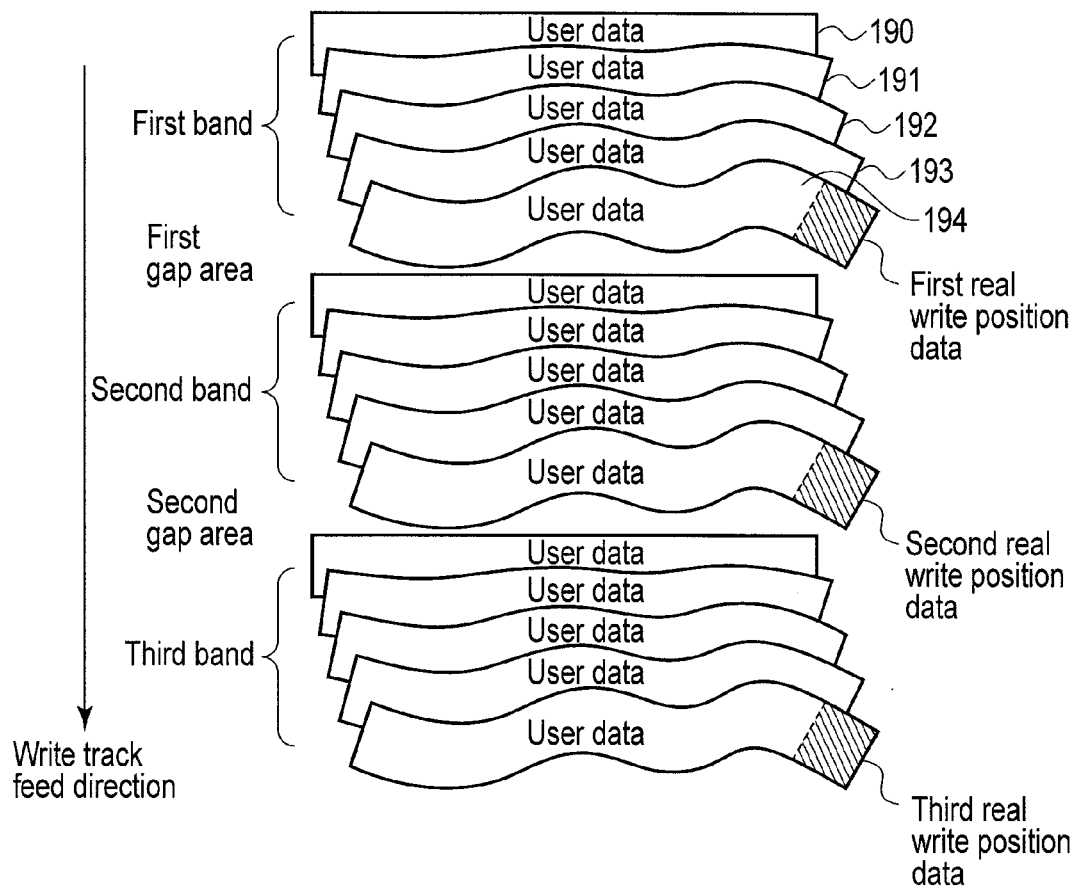
FIG. 20 is an exemplary view showing stored positions in tracks of real write position data stored in a real write position memory of a magnetic disk apparatus according to a eighth embodiment.

The real write position data is stored in each hatched portion shown in FIG. 20. In FIG. 20, it is assumed that first, second, and third bands are written in this order. Also, five tracks are written in order in each band. In the first band, for example, tracks 190, 191, 192, 193, and 194 are written in this order. Furthermore, the head 10 runs to the right in FIG. 20. Therefore, the real write position data with regard to the tracks written in the first band is stored as first real write position data in the hatched portion shown in FIG. 20.

Note that the configuration of the eighth embodiment can be combined with the configuration of any of the first to seventh embodiments.

In the eighth embodiment as explained above, the real write position data of a predetermined track is written in a sector at the end of each band. Accordingly, a read process can be performed without significantly decreasing the transfer rate of the process.

As has been explained above, in the first to eighth embodiments, the track write performance can be improved. In addition, the contraction amount of the write track width can be reduced. This can increase the read SNR. It is also possible to suppress the divergence of the write position correction amount, which occurs when reducing the contraction amount of the write track width. This makes it possible to suppress the reduction in read SNR caused by the destruction of written information caused by interference to adjacent tracks, or by a deviation equal to or larger than the read offset margin from the read orbit, in a track group written by the shingled write recording method.

Note that the above-described magnetic disk apparatus can also be a hybrid storage apparatus including a magnetic disk and nonvolatile memory.

Note also that the functions of the modules shown in FIGS. 3, 4, 8, 9, 11, 12, 13, 14, 16, 17, 18, and 19 can also be implemented by hardware such as a dedicated LSI or DSP.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information write apparatus comprising:
a write head configured to write a track on a magnetic disk by a shingled write recording format;
a read head configured to read a read signal from the track;
a target position calculation module configured to calculate a write target position of the track based on a pitch between the track and a track adjacent to the track;
a head position calculation module configured to calculate a position of the write head based on a servo read signal in the read signal;
a positioning error calculation module configured to calculate a positioning error for each sector of the track based on the write target position and the position of the write head;
a memory configured to store the calculated positioning error for each sector;
a correction module configured to, when writing a predetermined track, integrate the positioning error of each sector written before the predetermined track is written, and correct a write target position of the predetermined track based on the integrated positioning error of each sector; and a control module configured to control the position of the write head based on the corrected write target position of the predetermined track, when writing the predetermined track.

2. An information write apparatus comprising:
a write head configured to write a track on a magnetic disk by a shingled write recording format;
a correction module configured to correct a write target position of a first track based on a positioning error for each sector of a second track written before the first track is written; and
a control module configured to control a position of the write head based on the corrected write target position of the first track.

3. The apparatus of claim 2, wherein
the control module is further configured to control the position of the write head along an orbit of the second track.

4. The apparatus of claim 2, wherein
the correction module is further configured to correct the write target position of the first track by removing a predetermined frequency component from frequency components obtained from the positioning error of the second track.

5. The apparatus of claim 2, wherein
the correction module is further configured to correct the write target position of the first track within a range over which a correction amount of the write target position of the first track does not exceed a preset upper or lower limit.

6. The apparatus of claim 2, wherein
the correction module is further configured to correct the write target position of the first track based on a positioning error changing amount of a predetermined number of tracks written before the first track is written.

7. The apparatus of claim 2, wherein
the write head is configured to write a plurality of track groups,
the correction module is further configured to correct the write target position of the first track within a range over which a correction amount of the write target position of the first track does not exceed a preset upper limit, and
the control module is further configured to control the position of the write head such that a distance between the plurality of track groups in a radial direction is not less than a sum of the upper limit and a width of the write head in the radial direction.

8. The apparatus of claim 2, further comprising
a read head configured to read a read signal from the written track, wherein
the correction module is further configured to correct a read target position of the first track based on a write target position of the second track, and
the control module is further configured to control a position of the read head based on the corrected read target position of the first track.

9. The apparatus of claim 2, wherein
the write head is further configured to write a plurality of track groups, and
the apparatus further comprises a write module configured to write a correction amount of the write target position of the first track in a sector at the end of each track group.

10. The apparatus of claim 2, further comprising
a read head configured to read a read signal from the written track, wherein
the correction module is further configured to correct a read target position of the first track based on a write position of the second track, and
the control module is further configured to control a position of the read head based on the corrected read target position of the first track.

11. The apparatus of claim 2, wherein
the write head is further configured to write a plurality of track groups, and
the apparatus further comprises a write module configured to write data of a write position of the first track in a sector at the end of each track group.

12. An information write method comprising:
writing a track on a magnetic disk by a shingled write recording format;
correcting a write target position of a first track based on a positioning error for each sector of a second track written before the first track is written; and
controlling a position of the write head based on the corrected write target position of the first track.

13. The method of claim 12, wherein
the controlling comprises controlling the position of the write head along an orbit of the second track.

14. The method of claim 12, wherein
the correcting comprises correcting the write target position of the first track by removing a predetermined frequency component from frequency components obtained from the positioning error of the second track.

15. The method of claim 12, wherein
the correcting comprises correcting the write target position of the first track within a range over which a correction amount of the write target position of the first track does not exceed a preset upper or lower limit.

16. The method of claim 12, wherein
the correcting comprises correcting the write target position of the first track based on a positioning error changing amount of a predetermined number of tracks written before the first track is written.

17. The method of claim 12, wherein
the write head is configured to write a plurality of track groups,
the correcting comprises correcting the write target position of the first track within a range over which a correction amount of the write target position of the first track does not exceed a preset upper limit, and
the controlling comprises controlling the position of the write head such that a distance between the plurality of track groups in a radial direction is not less than a sum of the upper limit and a width of the write head in the radial direction.

18. The method of claim 12, wherein a read head is configured to read a read signal from the written track,
the correcting comprises correcting a read target position of the first track based on a write target position or a write position of the second track, and
the controlling comprises controlling a position of the read head based on the corrected read target position of the first track.

19. The method of claim 12, wherein
the write head is further configured to write a plurality of track groups, and
further comprising writing a correction amount of the write target position of the first track in a sector at the end of each track group.

20. The method of claim 12, wherein
the write head is further configured to write a plurality of track groups, and further comprising writing data of a write position of the first track in a sector at the end of each track group.

\* \* \* \* \*